(12) United States Patent
    Li

(10) Patent No.: US 11,047,145 B2
(45) Date of Patent: Jun. 29, 2021

(54) RECONFIGURABLE MOBILE SHELTER SYSTEM AND RELATED MANAGEMENT METHOD

(71) Applicant: APPOTRONICS CORPORATION LIMITED, Shenzhen (CN)

(72) Inventor: Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 382 days.

(21) Appl. No.: 16/221,317

(22) Filed: Dec. 14, 2018

(65) Prior Publication Data

US 2019/0186163 A1     Jun. 20, 2019

Related U.S. Application Data

(60) Provisional application No. 62/599,563, filed on Dec. 15, 2017.

(51) Int. Cl.
   *E04H 1/02*     (2006.01)
   *E04H 1/12*     (2006.01)
   (Continued)

(52) U.S. Cl.
   CPC .............. *E04H 1/02* (2013.01); *E04H 1/12* (2013.01); *B65D 88/022* (2013.01); *E04H 1/005* (2013.01);
   (Continued)

(58) Field of Classification Search
   CPC .. E04H 1/02; E04H 1/12; E04H 1/005; E04H 2001/1283; B65D 88/022; G06Q 10/0631
   See application file for complete search history.

(56) References Cited

U.S. PATENT DOCUMENTS

2003/0056446 A1    3/2003   Napier
2009/0049756 A1    2/2009   Cho
(Continued)

FOREIGN PATENT DOCUMENTS

CN    101048560 A    10/2007
CN    203905175 U    10/2014
(Continued)

OTHER PUBLICATIONS

International Search Report in the parent PCT application No. PCT/CN2018/121387, dated Mar. 20, 2019.
(Continued)

*Primary Examiner* — Gisele D Ford
(74) *Attorney, Agent, or Firm* — Chen Yoshimura LLP

(57) ABSTRACT

A reconfigurable mobile shelter system includes multiple shelter structures and a management system communicating with the shelter structures. The shelter structures are physically independent of each other, each located at a selected location, and configured to be moveable to another selected location without being disassembled and re-assembled. Each shelter structure has an access control subsystem and a user information collection module, and transmits user information to the management system. The management system, based on the received user information, determines whether to permit access by a user to a shelter structure and use of equipment inside, and transmits corresponding commands to the shelter structure. The management system also determines whether any shelter structure is to be moved to another selected location, and controls moving equipment to move them. The reconfigurable mobile shelter system may be used as a lodging facility, entertainment facility, office facility, education facility, meeting facility, etc.

12 Claims, 2 Drawing Sheets

(51) Int. Cl.
    *B65D 88/02*     (2006.01)
    *E04H 1/00*      (2006.01)
    *G06Q 10/06*     (2012.01)
    *G06Q 10/08*     (2012.01)

(52) U.S. Cl.
    CPC . *E04H 2001/1283* (2013.01); *G06Q 10/0631* (2013.01); *G06Q 10/087* (2013.01); *G06Q 10/0833* (2013.01)

(56) References Cited

U.S. PATENT DOCUMENTS

2011/0112854 A1* 5/2011 Koch .................... G06Q 10/06
                                                      705/2
2013/0164112 A1* 6/2013 Oren .................... B65G 65/32
                                                    414/802
2014/0298734 A1* 10/2014 Rogers ................... E04B 1/343
                                                     52/79.9

FOREIGN PATENT DOCUMENTS

CN         104196123 A       12/2014
CN         105735739 A        7/2016

OTHER PUBLICATIONS

Written Opinon in the parent PCT application No. PCT/CN2018/121387, dated Mar. 19, 2019.

* cited by examiner

RECONFIGURABLE MOBILE SHELTER SYSTEM AND RELATED MANAGEMENT METHOD

BACKGROUND OF THE INVENTION

Field of the Invention

This invention relates to a reconfigurable mobile shelter system and related management method.

Description of Related Art

Conventional entertainment facilities typically use permanent building structures. Such structures are located at specific locations, and constructed and interiorly equipped and decorated for specific purposes. Construction of such building structures can take a long time, and the buildings structures can occupy large areas; further, if they are no longer needed, or need to be replaced with other structures, they have to be demolished which can also take a long time. These result in high cost and long construction time.

SUMMARY

The present invention is directed to reconfigurable mobile shelter system and related management method that substantially obviate one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a reconfigurable mobile shelter system, which includes: a plurality of shelter structures which are physically independent of each other, each located at a selected location, and configured to be moveable to another selected location without being disassembled and re-assembled; and a management system implemented in a computer system and communicating with each of the plurality of shelter structures, wherein each shelter structure transmits information regarding itself to the management system, wherein the management system is configured to determine, based on the information received from the shelter structures, whether any shelter structure is to be moved to another selected location.

In some embodiments, the information transmitted by each shelter structure to the management system includes usage information about the shelter structure, and wherein the management system aggregates the usage information received from the plurality shelter structures, and analyzes the aggregate usage information to determine whether any shelter structure is to be moved to another selected location.

In some embodiments, each shelter structure includes: an access control subsystem configured to control physical access to the shelter structure and/or to control operation of one or more pieces of equipment inside the shelter structure; a user information collection module for collecting information from a user; a wireless communication module for communicating information with the management system; and a controller connected to the access control subsystem, the user information collection module and the wireless communication module, for communicating information with and controlling the access control subsystem, the user information collection module and the wireless communication module.

In some embodiments, the controller communicates user information to an external management system and receives commands from the external management system via wireless communication, and based on the received commands, controls the access control subsystem to grant or deny a user physical access to the shelter structure and/or usage of one or more pieces of equipment inside.

In some embodiment, each shelter structure further includes: a positioning module for determining a geographic position of the shelter structure; surveillance subsystem including a plurality of surveillance cameras; a data collection system for collecting data regarding physical conditions of the shelter structure; and a power supply subsystem for supplying power to the shelter structure.

In another aspect, the present invention provides a reconfigurable mobile shelter system, which includes: a plurality of shelter structures which are physically independent of each other, each located at a selected location, and configured to be moveable to another selected location without being disassembled and re-assembled; and a management system implemented in a computer system and communicating with each of the plurality of shelter structures, wherein each shelter structure includes: an access control subsystem configured to control physical access to the shelter structure and/or to control operation of one or more pieces of equipment inside the shelter structure; a user information collection module for collecting information from a user; a wireless communication module for communicating information with the management system; an access control subsystem configured to control physical access to the shelter structure and/or to control operation of one or more pieces of equipment inside the shelter structure; and a controller connected to the access control subsystem, the user information collection module and the wireless communication module, for communicating information with and controlling the access control module, the user information collection module and the wireless communication module; wherein each shelter structure transmits user information regarding a user to the management system, wherein the management system is configured to determine, based on the information received from any one of the shelter structures, whether to permit access to that shelter structure by the user, and to transmit a lock/unlock command to the one shelter structure, and wherein the controller of the shelter structure, based on the lock/unlock command received from the management system, controls the control circuit to lock or unlock the lock.

In some embodiments, each shelter structure further includes: a positioning module for determining a geographic position of the shelter structure; surveillance subsystem including a plurality of surveillance cameras; a data collection system for collecting data regarding physical conditions of the shelter structure; and a power supply subsystem for supplying power to the shelter structure.

In some embodiments, the controller of each shelter structure transmits usage information about the shelter structure to the management system, and wherein the management system aggregates the usage information received from the plurality shelter structures, and analyzes the aggregate usage information to determine whether any shelter structure is to be moved to another selected location.

In another aspect, the present invention provides an unattended shelter structure, which includes: an enclosed structure containing equipment inside, the enclosed structure being moveable as a whole without being disassembled and re-assembled; an access control subsystem configured to control physical access to the enclosed structure and/or to control operation of one or more pieces of equipment inside the enclosed structure; a user information collection module for collecting user information from a user; a wireless communication module for communicating information with an external management system; and a controller connected to the access control subsystem, the user information collection module, and the wireless communication module, for communicating the user information to an external management system and receiving commands from the external management system via wireless communication, and based on the received commands, controlling the access control subsystem to grant or deny a user physical access to the enclosed structure and/or usage of one or more pieces of equipment inside.

In some embodiments, the unattended shelter structure further includes: a positioning module for determining a geographic position of the shelter structure; surveillance subsystem including a plurality of surveillance cameras; and a data collection system for collecting data regarding physical conditions of the shelter structure; wherein the controller controls the positioning module, the surveillance subsystem, and the data collection system and transmits data collected by them to the external management system.

In some embodiments, the unattended shelter structure further includes: a power supply subsystem, connected to the controller, for supplying power to the shelter structure.

In some embodiments, the enclosed structure includes a door; and the access control subsystem includes a lock on the door and a control circuit configured to control the lock.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a reconfigurable mobile shelter system which employs multiple mobile buildings (shelter structures). Each mobile building is specifically designed interiorly for a defined purpose for human use. The mobile buildings are placed at desired locations, and are physically moveable so they can be relocated to different locations. Thus, the shelter system can be reconfigured based on practical need.

The reconfigurable mobile shelter system may be used as a lodging facility, an entertainment facility, an office facility, an education facility, a meeting facility, etc. or combinations thereof.

Figure 1:
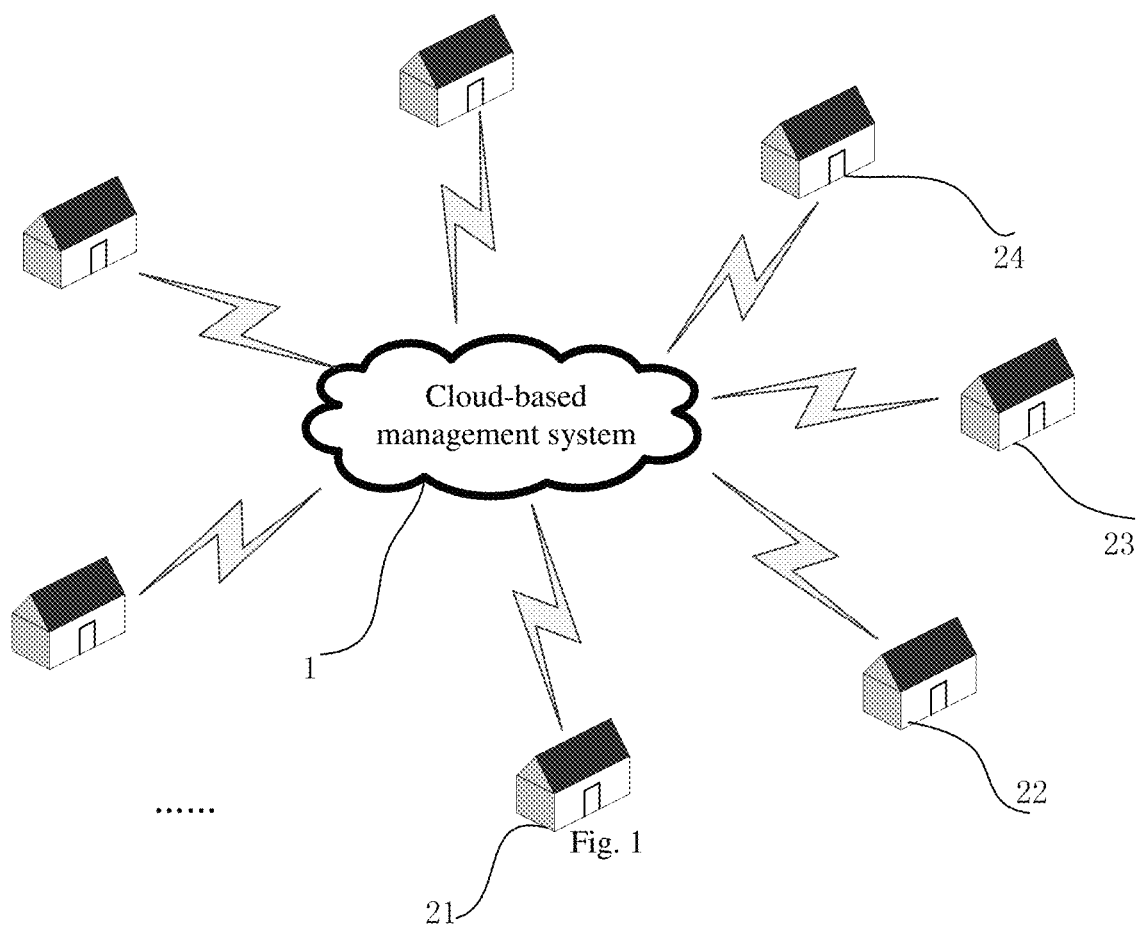
FIG. 1 schematically illustrates a reconfigurable mobile shelter system according to an embodiment of the present invention.

FIG. 1 schematically illustrates a reconfigurable mobile shelter system according to an embodiment of the present invention. The system may be unmanned (unattended by human operators either locally or remotely), or managed by human operators remotely. The system includes a computerized management system 1 and multiple unattended shelter structures 2 (e.g. 21, 22, 23, 24, . . . ) which communicate with the management system 1. Each shelter structure is an enclosed structure with controlled physical access. The multiple unattended shelter structures 2 are physically independent of each other. The computerized management system 1, which employs one or more server computers, may be a cloud-based system distribution in a star topology. The cloud-based management system 1 receives information from unattended shelter structures 2 and sends commands to the shelter structures.

Each shelter structure 2 transmits information about itself and information about users of the shelter structure to the cloud-based management system 1. The management system 1, based on the information received from the shelter structures 2, determines whether to move any particular shelter structure 2 to change its location. If a shelter structure 2 is to be moved, the management system 1 controls moving equipment to move the shelter structure 2 to a new location. The moving equipment may include, for example, trucks, cranes, or other equipment for loading and unloading, etc., and combinations thereof. The shelter structure 2 (including its contents) is moved as a whole, without being disassembled and re-assembled. Thus, the entire shelter system can be reconfigured easily, which saves construction related cost and time. Moreover, the shelter system can be easily managed, as all relevant information is available on the cloud-based management system 1.

Figure 2:
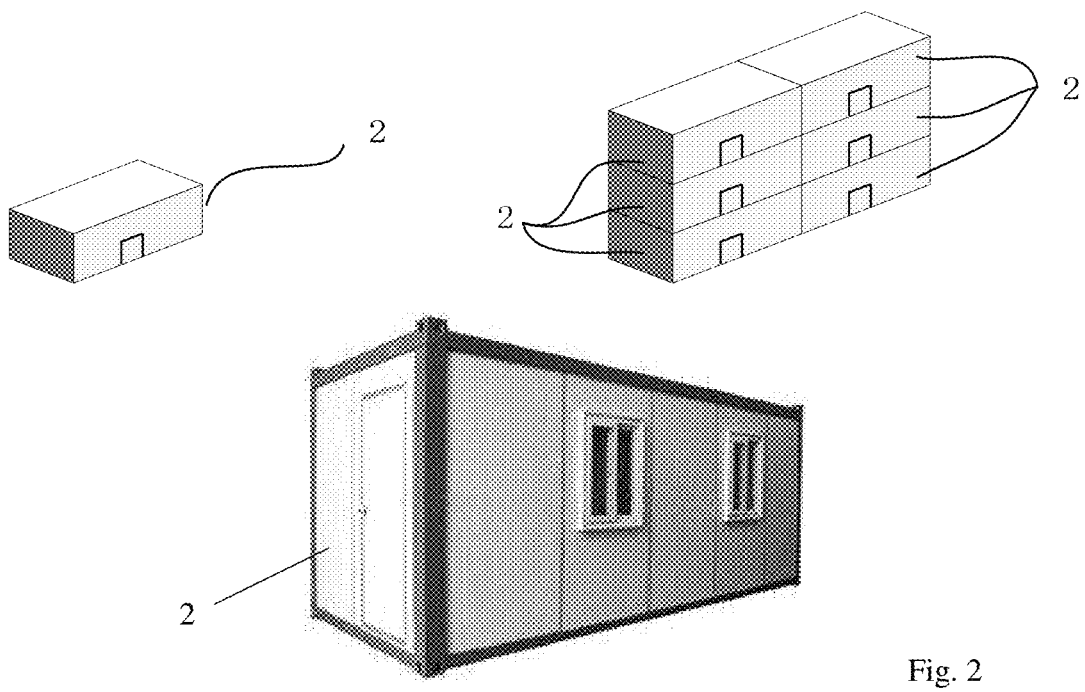
FIG. 2 schematically illustrates a shelter structure unattached to other shelter structures and multiple shelter structures arranged side-by-side and stacked together.

The shelter structures 2 may be positioned individually and physically separate from each other, or positioned side by side horizontally or stacked vertically, as shown in FIG. 2. Preferably, each shelter structure 2 is a six-sided three-dimensional shape having a flat roof so that they can be conveniently stacked.

In some implementations, the shelter structure 2 is formed of a metal frame (e.g. galvanized steel), and the walls, ceiling and floor are formed of suitable materials such as metal or other materials. In one example, the shelter structure 2 is adapted from a conventional shipping container. The interior of the shipping container is decorated and equipped according to need. One advantage of using conventional shipping containers is that equipment for moving them is readily available.

The reconfiguration of the mobile shelter system, e.g. by moving the shelter structures 2, may be managed based on data collected from each shelter structure and aggregate of data collected from all shelter structures. The aggregate data may be analyzed statistically to determine how the system should be reconfigured. For example, if based on the aggregate data over a time period, it is determined that shelter structures at a particular geographic location have higher usage efficiency than at other locations, more shelter structures may be moved to the particular location from the other locations. In another example, the aggregate data may be analyzed to discover time-dependent usage patterns. For example, if the data indicates that shelter structures at certain geographic locations have higher usage efficiency on weekdays while shelter structures at certain other geographic locations have higher usage efficiency on weekends, then shelter structures may be moved accordingly between the two types of locations on a weekly basis. Such data analysis may be done on an on-going basis to timely reconfigure the system based on the collected data. The analysis of the collected data and the determination of how to reconfigure the system may be done automatically by the management system 1 without human intervention, or it may be done with human supervision.

Figure 3:
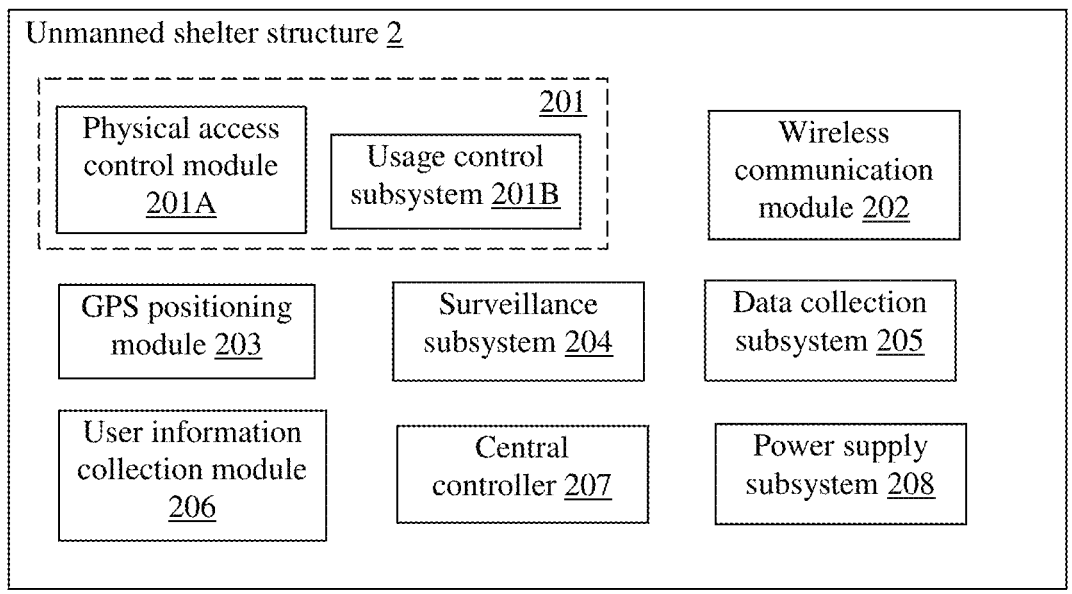
FIG. 3 schematically illustrates the components of an unattended shelter structure according to an embodiment of the present invention.

Referring to FIG. 3, the unattended shelter structure 2 is equipped with a physical access control module 201A to control physical access to the shelter structure, for example, by locking or unlocking a lock on the door, and/or a usage control subsystem 201B to control usage or operation of the various equipment and services provided inside the shelter structure. The shelter structure 2 includes a wireless communication module 202 which may be implemented by wireless communication devices that use cellular, WiFi, satellite, or other wireless communication technologies. In some embodiments, it also includes a positioning module 203 which may be implemented by, for example, a GPS positioning device and/or cellular-technology based positioning device for determining a geographic position of the shelter structure 2. The shelter structures 2 may further include a surveillance subsystem 204 including surveillance cameras for monitoring purposes, to ensure safe and controlled operation of the unattended shelter structures 2. The shelter structure 2 further includes a data collection subsystem 205 (implemented by, e.g., computers or processors with associated data storage devices and computer-executable programs), which collects information about physical conditions of the shelter structure, and the data can be communicated to the management system 1.

The shelter structure 2 includes a user information collection module 206 for collecting information about the current user. This module may include one or more user interface devices such as alphanumeric keypad, card reader, RFID reader, optical scanner, video camera, biometric information reader, etc., and optionally, a processor with data processing software, to collect identification and other information of the user and to interface with the user. In one example, the user information collection module 206 employs face recognition technology to detect the identity of the persons entering the unattended shelter structure 2. The shelter structure 2 collaborates with the management system 1 to allow user physical access to the shelter structure 2 (via the physical access control module 201A) and/or use of the equipment and services inside (via the usage control subsystem 201B) based on the user information collected by the user information collection module 206.

The shelter structure 2 further includes a central controller 207 (implemented by, e.g., one or more processors with associated memory, software and communication interface) which communicates with and controls the other modules and subsystems 201-206 of the shelter structure 2.

The cloud-based management system 1 provides computerized and automatic management of the unattended shelter structures 2. The management system 1 may includes a user payment processing subsystem (implemented by, e.g., computers or processors with associated data storage devices and computer-executable programs). The management system 1 stores user information, and users can establish communication and perform transactions with the management system 1 via the user information collection module 206 of the shelter structure 2.

In one embodiments, the operation of the reconfigurable mobile shelter system is as follows. The controller 207 controls the operation of the unattended shelter structure 2 and communicates with and collaborate with the cloud-based management system 1. The controller 207 transmits data about the shelter structure 2 to the management system 1. The wireless communication module 202 is used to establish communication between the shelter structure 2 and the management system 1. The positioning module 203 obtains the position information of the shelter structure 2 and forwards it to the controller 207, which transmits the position information to the management system 1. The physical access control module 201A controls the lock/unlock state of the lock based on a lock/unlock command received from the controller 207. The controller 207 communicates information of the lock/unlock state to the management system 1, and the information may include a time stamp.

The physical access control module 201A may include a mechanical and/or electromagnetic lock and an electronic control circuit that controls the lock. When the shelter structure 2 receives from the management system 1 a lock/unlock command to unlock the lock, the controller 207 triggers the electronic control circuit to unlock the lock. After the lock is successfully unlocked, the controller 207 communicates the unlocking event to the management system 1. As mentioned earlier, the user information collection module 206 enables the shelter structure 2 to interact with the user. The requisite user information detected by the user information collection module 206, such as user identification and/or payment method information, is transmitted to the management system 1. The management system 1 processes the user information, and transmits a lock/unlock command to the shelter structure 2 to permit physical access by the user.

The usage control subsystem 201B controls usage of the various equipment inside the shelter structure 2. Similar to the physical access control module 201A described above, the usage control subsystem 201B collaborates with the user information collection module 206 and the controller 207, and interacts with the cloud-based management system 1 to manage use of the equipment by the user based on the user information collected by the user information collection module 206.

The specific structures of the usage control subsystem 201B depend on the equipment and services being provided by the shelter, and the subsystem may include independent control devices for each piece of equipment, which may be integrated with the pieces of equipment. For example, the on/off of a piece of electronic equipment may be controlled to control its usage. Also, depending on the equipment and services provided, the physical access control module 201A or the usage control subsystem 201B may not be necessary or may not be activated. For example, when the shelter structure is a lodging facility, the physical access control module 201A will be provided, and consumable items (e.g. snacks, drinks) may be available inside and the usage control subsystem 201B (e.g. a locked container) may be provided to control their use. In another example, when the shelter structure 2 is a reading room with reading materials inside, the physical access control module 201A may be provided (e.g. using face recognition technology) but no additional usage control subsystem 201B is required for use of the reading materials. In another example, when the shelter structure 2 is a multimedia entertainment room with audio-visual equipment or video game equipment, etc., the physical access control module 201A is not provided or not activated so that users can enter the shelter structures freely, but the various pieces of equipment (e.g. projectors) inside are controlled by various components of the usage control subsystem 201B. In addition, the various components of the physical access control module 201A and usage control subsystem 201B may be also linked; for example, in the case of a multimedia entertainment room, once the usage control subsystem 201B grants a user permission to use the audio-visual equipment, the physical access control module 201A may be activated to close or lock the door for the convenience of the user. These are just some examples of how physical access control and/or equipment usage control may be implemented; other examples may be designed based on the purpose of the shelter structure 2.

Stated more generally, the shelter structure 2 has an access control subsystem 201 which includes various components 201A and/or 201B to control physical access to the shelter and/or usage of equipment in the shelter. The access control subsystem 201 collaborates with the user information collection module 206 and the cloud-based management system 1 to control physical access and use various equipment and services of the shelter structure 2 based on user information.

Further, the shelter structure 2 may include a power supply subsystem 208 to supply power to the shelter structure. The power supply subsystem may use external electrical power, batteries, or a solar power system. It may also have a control circuit connected to the central controller 207 to turn on and off the power supply based on whether user access is permitted.

Each module, device or subsystem of the shelter structure 2 described above is implemented by requisite hardware and control circuitry.

As mentioned earlier, the shelter structures 2 can be equipped and decorated interiorly for specific purposes, for example, for use as lodging facility, entertainment facility, office facility, education facility, meeting facility, etc. For example, they can be equipped and furnished as a bar, an audio-video room, a game room, etc. When it is used as an audio-video room, for example, they can be equipped with audio-visual system including projectors and sound equipment; such equipment has standard communication interfaces, and can be connected to a network by wired or wireless links to provide entertainment content. The audio-visual system may also be connected to the cloud-based management system 1 to allow the user to order desired content.

The reconfigurable mobile shelter system and related management method maximizes the utility of each mobile building and provide a more flexible system which can adaptive to different needs.

It will be apparent to those skilled in the art that various modification and variations can be made in the reconfigurable mobile shelter system and related management method of the present invention without departing from the spirit or scope of the invention. Thus, it is intended that the present invention cover modifications and variations that come within the scope of the appended claims and their equivalents.

What is claimed is:

1. A reconfigurable mobile shelter system, comprising:
    a plurality of shelter structures which are physically independent of each other, each located at a selected location, and configured to be moveable to another selected location without being disassembled and re-assembled; and
    a management system implemented in a computer system and communicating with each of the plurality of shelter structures,
    wherein each shelter structure transmits information regarding itself to the management system,
    wherein the management system is configured to determine, based on the information received from the shelter structures, whether any shelter structure is to be moved to another selected location.

2. The reconfigurable mobile shelter system of claim 1, wherein the information transmitted by each shelter structure to the management system includes usage information about the shelter structure, and wherein the management system aggregates the usage information received from the plurality shelter structures, and analyzes the aggregate usage information to determine whether any shelter structure is to be moved to another selected location.

3. The reconfigurable mobile shelter system of claim 1, wherein each shelter structure includes:
    an access control subsystem configured to control physical access to the shelter structure and/or to control operation of one or more pieces of equipment inside the shelter structure;
    a user information collection module for collecting information from a user;
    a wireless communication module for communicating information with the management system; and
    a controller connected to the access control subsystem, the user information collection module and the wireless communication module, for communicating information with and controlling the access control subsystem, the user information collection module and the wireless communication module.

4. The reconfigurable mobile shelter system of claim 1, wherein the controller communicates user information to an external management system and receives commands from the external management system via wireless communication, and based on the received commands, controls the access control subsystem to grant or deny a user physical access to the shelter structure and/or usage of one or more pieces of equipment inside.

5. The reconfigurable mobile shelter system of claim 1, wherein each shelter structure further includes:
    a positioning module for determining a geographic position of the shelter structure;
    surveillance subsystem including a plurality of surveillance cameras;
    a data collection system for collecting data regarding physical conditions of the shelter structure; and
    a power supply subsystem for supplying power to the shelter structure.

6. A reconfigurable mobile shelter system, comprising:
    a plurality of shelter structures which are physically independent of each other, each located at a selected location, and configured to be moveable to another selected location without being disassembled and re-assembled; and
    a management system implemented in a computer system and communicating with each of the plurality of shelter structures,
    wherein each shelter structure includes:
        an access control subsystem configured to control physical access to the shelter structure and/or to control operation of one or more pieces of equipment inside the shelter structure;
        a user information collection module for collecting information from a user;
        a wireless communication module for communicating information with the management system; and
        a controller connected to the access control subsystem, the user information collection module and the wireless communication module, for communicating information with and controlling the access control module, the user information collection module and the wireless communication module;

wherein each shelter structure transmits user information regarding a user to the management system, wherein the management system is configured to determine, based on the information received from any one of the shelter structures, whether to permit access to that shelter structure by the user, and to transmit a lock/unlock command to the one shelter structure, and wherein the controller of the shelter structure, based on the lock/unlock command received from the management system, controls the control circuit to lock or unlock the lock.

7. The reconfigurable mobile shelter system of claim 6, wherein each shelter structure further includes:
   a positioning module for determining a geographic position of the shelter structure;
   surveillance subsystem including a plurality of surveillance cameras;
   a data collection system for collecting data regarding physical conditions of the shelter structure; and
   a power supply subsystem for supplying power to the shelter structure.

8. The reconfigurable mobile shelter system of claim 6, wherein the controller of each shelter structure transmits usage information about the shelter structure to the management system, and wherein the management system aggregates the usage information received from the plurality shelter structures, and analyzes the aggregate usage information to determine whether any shelter structure is to be moved to another selected location.

9. An unattended shelter structure, comprising:
   an enclosed structure containing equipment inside, the enclosed structure being moveable as a whole without being disassembled and re-assembled;
   an access control subsystem configured to control physical access to the enclosed structure and/or to control operation of one or more pieces of equipment inside the enclosed structure;
   a user information collection module for collecting user information from a user;
   a wireless communication module for communicating information with an external management system; and
   a controller connected to the access control subsystem, the user information collection module, and the wireless communication module, for communicating the user information to an external management system and receiving commands from the external management system via wireless communication, and based on the received commands, controlling the access control subsystem to grant or deny a user physical access to the enclosed structure and/or usage of one or more pieces of equipment inside.

10. The unattended shelter structure of claim 9, further comprising:
    a positioning module for determining a geographic position of the shelter structure;
    surveillance subsystem including a plurality of surveillance cameras; and
    a data collection system for collecting data regarding physical conditions of the shelter structure;
    wherein the controller controls the positioning module, the surveillance subsystem, and the data collection system and transmits data collected by them to the external management system.

11. The unattended shelter structure of claim 9, further comprising:
    a power supply subsystem, connected to the controller, for supplying power to the shelter structure.

12. The unattended shelter structure of claim 9,
    wherein the enclosed structure includes a door; and
    wherein the access control subsystem includes a lock on the door and a control circuit configured to control the lock.

* * * * *